United States Patent
Wai (10) Patent No.: US 10,041,319 B2
(45) Date of Patent: Aug. 7, 2018

(54) DOWNHOLE APPARATUS WITH ANCHORS AND FAILSAFE HIGH TORQUE TRANSMISSION DRIVE

(71) Applicant: HALLIBURTON ENERGY SERVICES, INC., Houston, TX (US)

(72) Inventor: Simon Whye Kwong Wai, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/541,985

(22) PCT Filed: Feb. 13, 2015

(86) PCT No.: PCT/US2015/015815
§ 371 (c)(1),
(2) Date: Jul. 6, 2017

(87) PCT Pub. No.: WO2016/130142
PCT Pub. Date: Aug. 18, 2016

(65) Prior Publication Data
US 2017/0356261 A1  Dec. 14, 2017

(51) Int. Cl.
*E21B 23/01* (2006.01)
*F16H 25/22* (2006.01)
*F16H 25/20* (2006.01)

(52) U.S. Cl.
CPC ......... *E21B 23/01* (2013.01); *F16H 25/2204* (2013.01); *F16H 2025/2043* (2013.01); *F16H 2025/2071* (2013.01)

(58) Field of Classification Search
CPC ......... F16H 25/2204; F16H 2025/2043; F16H 2025/2071; E21B 23/01
See application file for complete search history.

(56) References Cited

U.S. PATENT DOCUMENTS

| | | |
|---|---|---|
| 2003/0024710 A1 | 2/2003 | Post et al. |
| 2003/0173076 A1 | 9/2003 | Sheiretov et al. |
| 2011/0067926 A1 | 3/2011 | Moore |

FOREIGN PATENT DOCUMENTS

| | | |
|---|---|---|
| EP | 2770158 A1 | 8/2014 |
| WO | WO 2014081305 A1 | 5/2014 |

OTHER PUBLICATIONS

International Search Report and Written Opinion for International Application No. PCT/US2015/015815 dated Oct. 20, 2015. (14 pages).

*Primary Examiner* — D. Andrews
*Assistant Examiner* — Yanick A Akaragwe
(74) *Attorney, Agent, or Firm* — Haynes and Boone, LLP (57) ABSTRACT

According to one aspect, a downhole apparatus includes an anchor element mechanically coupled between first and second housings and linked to move radially between first and second radial positions; and a high torque electromechanical transmission drive; wherein the anchor element is adapted to engage a preexisting structure when the downhole apparatus extends within the preexisting structure, the high torque electromechanical transmission drive is energized, and the anchor element is in the second radial position; and wherein the high torque electromechanical transmission drive is failsafe in that the anchor element is permitted to move radially from the second radial position towards the first radial position in response to de-energization of the high torque electromechanical transmission drive. In several embodiments, the preexisting structure is a casing positioned within a wellbore that traverses a subterranean formation.

19 Claims, 4 Drawing Sheets

DOWNHOLE APPARATUS WITH ANCHORS AND FAILSAFE HIGH TORQUE TRANSMISSION DRIVE

TECHNICAL FIELD

The present disclosure relates generally to oil or gas operations, and in particular to well intervention operations using a downhole apparatus with anchors and a failsafe high torque transmission drive.

BACKGROUND

In oil or gas operations, such as well intervention operations, an anchor may be deployed to hold a tool string in a casing positioned within a wellbore that traverses one or more subterranean formations. Setting or deploying the anchor may require application of relatively high torque. A high torque transmission drive, which may include a motor, may be used. However, if a power failure occurs after the anchor is set or deployed and thus power is no longer supplied to the motor, the anchored tool string may be stuck down hole, with the high torque transmission drive incapable of releasing the anchor. Further, the volumetric envelope of the high torque transmission drive may be too large for some downhole applications. Still further, the high torque transmission drive may not be scalable to meet high torque requirements and/or size constraints.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in a downhole apparatus with anchors and a failsafe high torque transmission drive. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

This disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Figure 1:
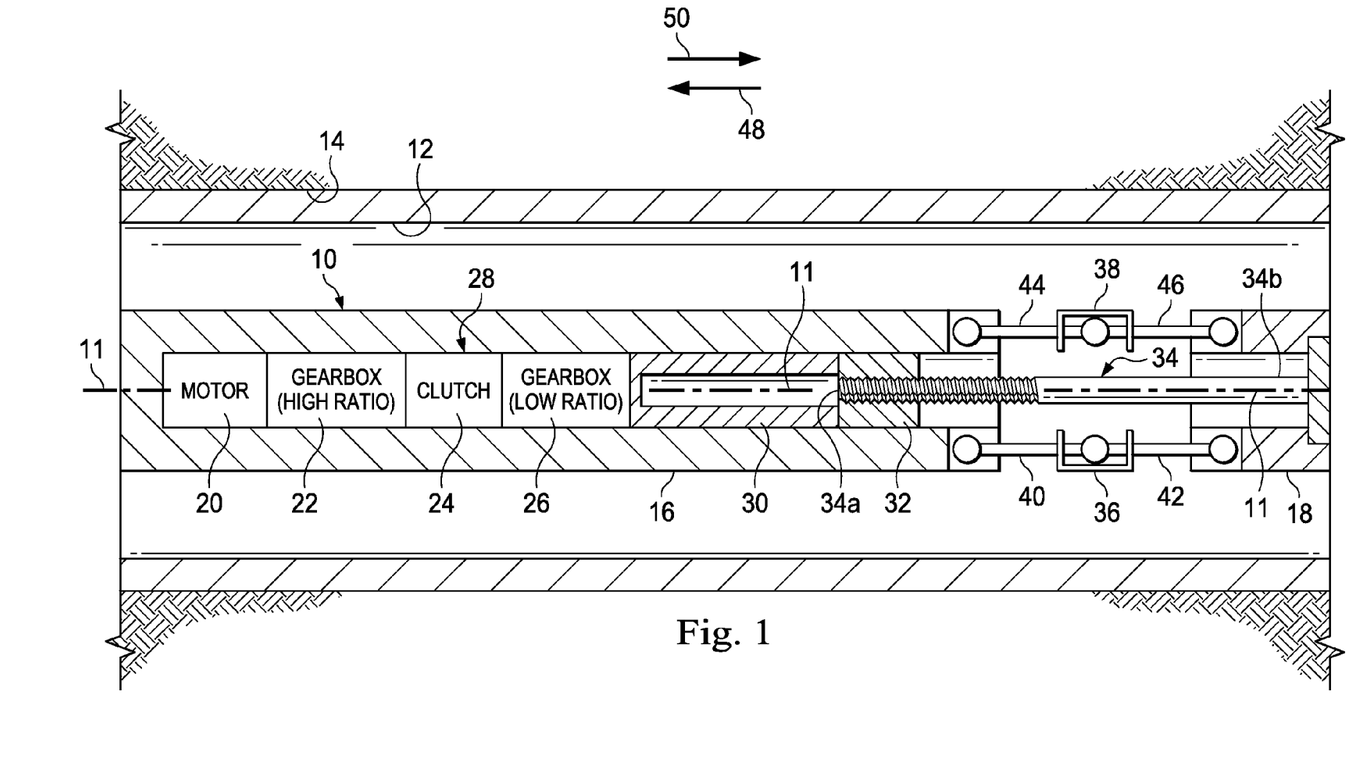
FIG. 1 is a diagrammatic illustration of a section of a downhole apparatus disposed within a casing, according to an exemplary embodiment.

In an exemplary embodiment, as illustrated in FIG. 1, a downhole apparatus is generally referred to by the reference numeral 10. The downhole apparatus 10 has a longitudinal center axis 11 and is positioned within a casing 12, which is positioned within a wellbore 14 that traverses one or more subterranean formations. In several exemplary embodiments, the downhole apparatus 10, the casing 12, and the wellbore 14 facilitate oil or gas exploration and/or production operations. In several exemplary embodiments, instead of the casing 12, the downhole apparatus 10 may be positioned within another type of preexisting structure such as, for example, a tubular liner, a pipeline, a structural support, or an openhole section of the wellbore 14 rather than the cased section of the wellbore 14 shown in FIG. 1.

As shown in FIG. 1, the downhole apparatus 10 includes housings 16 and 18 spaced along the longitudinal axis 11. A motor 20, to which electrical power is supplied, thereby energizing the motor 20, extends within the housing 16. An input gearbox 22 is driven by the motor 20. A clutch 24 is mechanically coupled to the input gearbox 22. An output gearbox 26 is optionally coupled to the clutch 24 so that the output gearbox 26 is driven by the input gearbox 22 when the clutch 24 is engaged. In an exemplary embodiment, electrical power is supplied to the motor 20, thereby energizing the motor 20. In an exemplary embodiment, the motor 20 is a DC motor to which DC power is supplied. The input gearbox 22 and the output gearbox 26 have respective gear ratios. In an exemplary embodiment, the gear ratio of the output gearbox 26 is less than the gear ratio of the input gearbox 22. In an exemplary embodiment, the gear ratio of the output gearbox 26 is less than the gear ratio of the input gearbox 22, with the gear ratio of the input gearbox being 200:1 and the gear ratio of the output gearbox 26 being 5:1. In several exemplary embodiments, the motor 20, the input gearbox 22, the clutch 24, and the output gearbox 26 are, or are part of, a high torque electromechanical transmission drive 28.

An adapter 30 extends within the housing 16 and is mechanically coupled to the output gearbox 26. A nut 32 is connected to the adapter 30. A linear actuator 34 extends within the nut 32 and is threadably engaged therewith. The linear actuator 34 includes opposing end portions 34a and 34b. As shown in FIG. 1, the end portion 34a is threadably engaged with the nut 32, and extends within the housing 16. In contrast, the end portion 34b is connected to the housing 18 so that the linear actuator 34 extends between the housings 16 and 18. In an exemplary embodiment, the linear actuator 34 is a ballscrew, the nut 32 is a ball nut, and the adapter 30 is a ball nut adapter. In an exemplary embodiment, the linear actuator 34 is a leadscrew.

Anchor elements 36 and 38 are mechanically coupled between the housings 16 and 18. More particularly, in an exemplary embodiment, anchor arms 40 and 42 extend from the housings 16 and 18, respectively, and to the anchor element 36. Likewise, anchor arms 44 and 46 extend from the housings 16 and 18, respectively, and to the anchor element 38. In an exemplary embodiment, the anchor arms 40 and 44 are pivotally connected to the housing 16, and the anchor arms 42 and 46 are pivotally connected to the housing 18. In an exemplary embodiment, the anchor arms 40 and 42 are pivotally connected to the anchor element 36, and the anchor arms 44 and 46 are pivotally connected to the anchor element 38. In several exemplary embodiments, one or more of the anchor elements 36 and 38 include a plurality of anchor elements. In several exemplary embodiments, one or more of the anchor arms 40, 42, 44, and 46 include a plurality of anchor arms. In an exemplary embodiment, the anchor elements 36 and 38 are wedge-type anchor elements, high-expansion-type anchor elements, button-type anchor elements, or any combination thereof.

Figure 2:
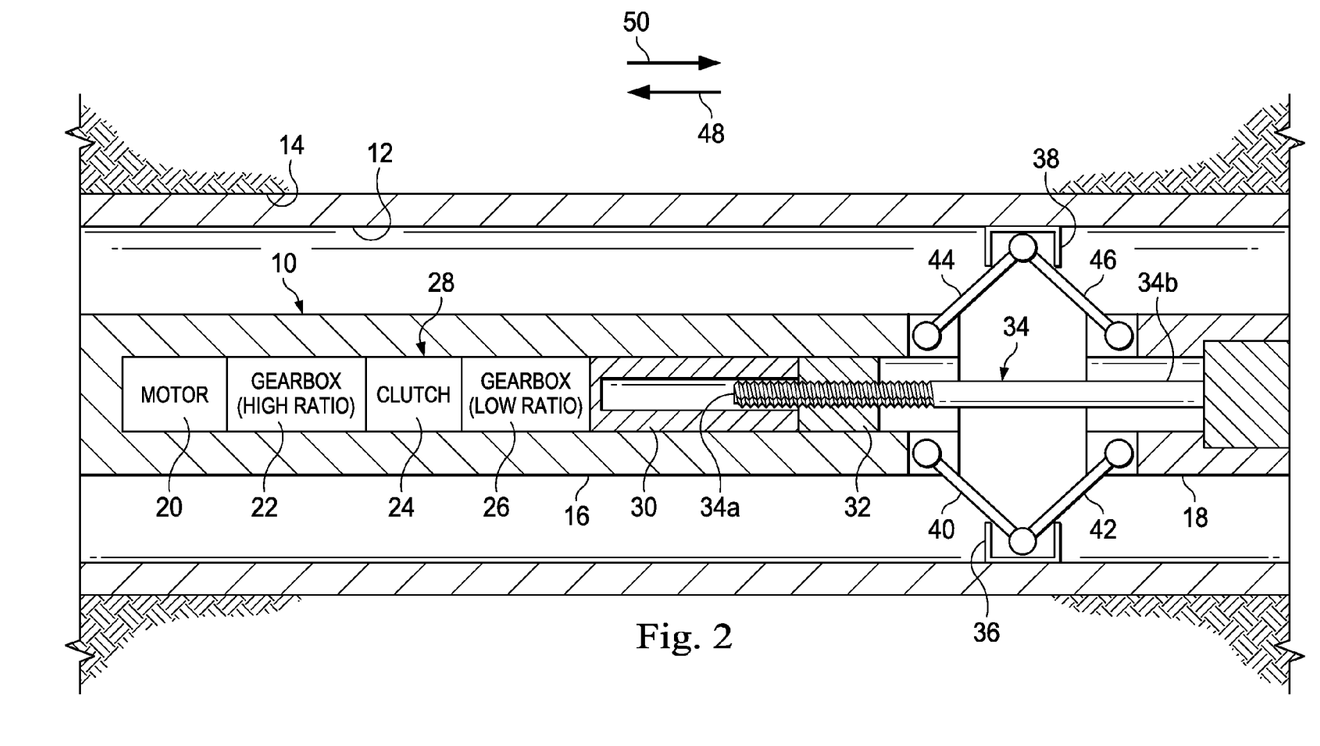
FIG. 2 is a view similar to that of FIG. 1 but depicting the downhole apparatus in a different operational mode, according to an exemplary embodiment.

In operation, in an exemplary embodiment and as illustrated in FIGS. 1 and 2, the downhole apparatus 10 is disposed within the casing 12. In several exemplary embodiments, the downhole apparatus 10 may be, or be part of, a downhole tool string extending within the casing 12. In an exemplary embodiment, it may be desired to hold the tool string, of which the downhole apparatus 10 is at least a part, in the casing 12 while a job or operation is performed towards the bottom of the casing 12 or the wellbore 14. To so hold the tool string of which the downhole apparatus 10 is at least a part, the anchor elements 36 and 38 are deployed so that the anchor elements 36 and 38 engage the casing 12, anchoring the tool string.

To deploy the anchor elements 36 and 38, the motor 20 is energized with electrical power and the motor 20 is operated to drive the input gearbox 22, which in turn engages the clutch 24 and drives the output gearbox 26 via the clutch 24. The output gearbox 26 drives axial movement of the housing 18, relative to the housing 16 and in a direction 48, so that the anchor elements 36 and 38 radially move from their respective radial positions shown in FIG. 1 to their respective radial positions shown in FIG. 2. In particular, the output gearbox 26 drives the adapter 30 to rotate in place so that the nut 32 rotates in place along with the adapter 30. As a result of the rotation of the nut 32, the linear actuator 34 axially moves in the direction 48. The axial movement of the linear actuator 34 in the direction 48 causes the housing 18 to axially move, relative to the housing 16 and in the direction 48. In response to the axial movement of the housing 18 in the direction 48, the anchor elements 36 and 38 radially move from their respective radial positions shown in FIG. 1 to their respective radial positions shown in FIG. 2. In their respective radial positions shown in FIG. 1, the anchor elements 36 and 38 do not engage the casing 12 and relative movement between the casing 12 and the housings 16 and 18 is permitted. In their respective radial positions shown in FIG. 2, the anchor elements 36 and 38 engage the casing 12 to prevent, or at least resist, relative axial movement between the casing 12 and the housings 16 and 18. In several exemplary embodiments, the downhole apparatus 10 is anchored to the casing 12 when the anchor elements 38 and 38 are in their respective radial positions shown in FIG. 2.

In several exemplary embodiments, to release the anchor elements 36 and 38 and thus the downhole apparatus 10 from the casing 12, the motor 20 is again operated to drive the input gearbox 22, which in turn drives the output gearbox 26 via the clutch 24. However, in contrast to when the anchor elements 36 and 38 are deployed, the motor 20 is operated so that the output gearbox 26 drives axial movement of the housing 18, relative to the housing 16 and in a direction 50, so that the anchor elements 36 and 38 collapse, radially moving from their respective radial positions shown in FIG. 2 to their respective radial positions shown in FIG. 1. The direction 50 is opposite the direction 48. In particular, the output gearbox 26 drives the adapter 30 to rotate in place so that the nut 32 rotates in place along with the adapter 30. As a result of the rotation of the nut 32 when releasing the anchor elements 36 and 38, the linear actuator 34 axially moves in the direction 50. The axial movement of the linear actuator 34 in the direction 50 causes the housing 18 to axially move, relative to the housing 16 and in the direction 50. In response to the axial movement of the housing 18 in the direction 50, the anchor elements 36 and 38 radially move from their respective radial positions shown in FIG. 2 to their respective radial positions shown in FIG. 1.

During operation, in an exemplary embodiment, the downhole apparatus 10 is automatically released from the casing 12 in response to a de-energization of the motor, e.g., a cessation of the supply of electrical power to the motor 20, making the downhole apparatus 10 failsafe. More particularly, when the motor 20 is de-energized, the clutch 24 automatically decouples the input gearbox 22 from the output gearbox 26. As a result of the operation of the clutch 24, the motor 20 and input gearbox 22 are disengaged from the high torque electromechanical transmission drive 28. The gear ratio of the output gearbox 26, which as noted above is lower than the gear ratio of the input gearbox 22, permits the anchor elements 36 and 38 to move radially from their respective radial positions shown in FIG. 2 and at least towards their respective radial positions shown in FIG. 1. Further, the housing 18 is permitted to move axially, relative to the housing 16 and in the direction 50, in response to the radial movement of the anchor elements 36 and 38. Still further, the output gearbox 26 is permitted to be back driven in response to the axial movement of the housing 18, relative to the housing 16 and in the direction 50. In response to the radial movement of the anchor elements 36 and 38 away from the casing 12, the housing 18 axially moves away from the housing 16 in the direction 50. As a result, the linear actuator 34 moves in the direction 50, causing the nut 32 to rotate, which causes the adapter 30 to rotate along with the nut 32. The rotation of the adapter 30 back drives the output gearbox 26. Thus, the anchor elements 36 and 38 automatically collapse in response to the de-energization of the motor 20, making the downhole apparatus 10 failsafe. The high torque electromechanical transmission drive 28 is failsafe in that the anchors 36 and 38 are permitted to move radially and collapse in response to the de-energization of the motor 20.

In an exemplary embodiment, as a result of the operation of the failsafe high torque electromechanical transmission drive 28, the tool string, of which the downhole apparatus 10 is or is a part, will not be stuck in the casing 12 in the event of a power failure. Since the gear ratio of the output gearbox 26 is relatively low, back driving the output gearbox 26 is possible and the anchor elements 36 and 38 are able to collapse automatically, making the downhole apparatus 10 failsafe.

Moreover, in an exemplary embodiment, since the gear ratio of the output gearbox 26 is relatively low, the torque requirement for the clutch 24 is reduced tremendously and the required physical size thereof is also reduced, making it possible to fit the clutch 24 within an embodiment of the housing 16 having a relatively small diameter suitable for downhole applications. The volumetric envelope of at least the input gearbox 22, the clutch 24, and the output gearbox 26 is reduced to fit into the overall envelope of the downhole apparatus 10, or at least the housing 16.

In several exemplary embodiments, the downhole apparatus 10, including the high torque electromechanical transmission drive 28 with the above-described failsafe, is suitable for high torque applications down hole. The amount of torque, and whether it is a high torque application, may be related to the diameter of the apparatus 10, or at least the housing 16. In one embodiment, an example of such a high torque application requires 2,400 in-lb of torque with the housing 16 having a 3.125 inch diameter (2.65 inch inside diameter).

Figure 3:
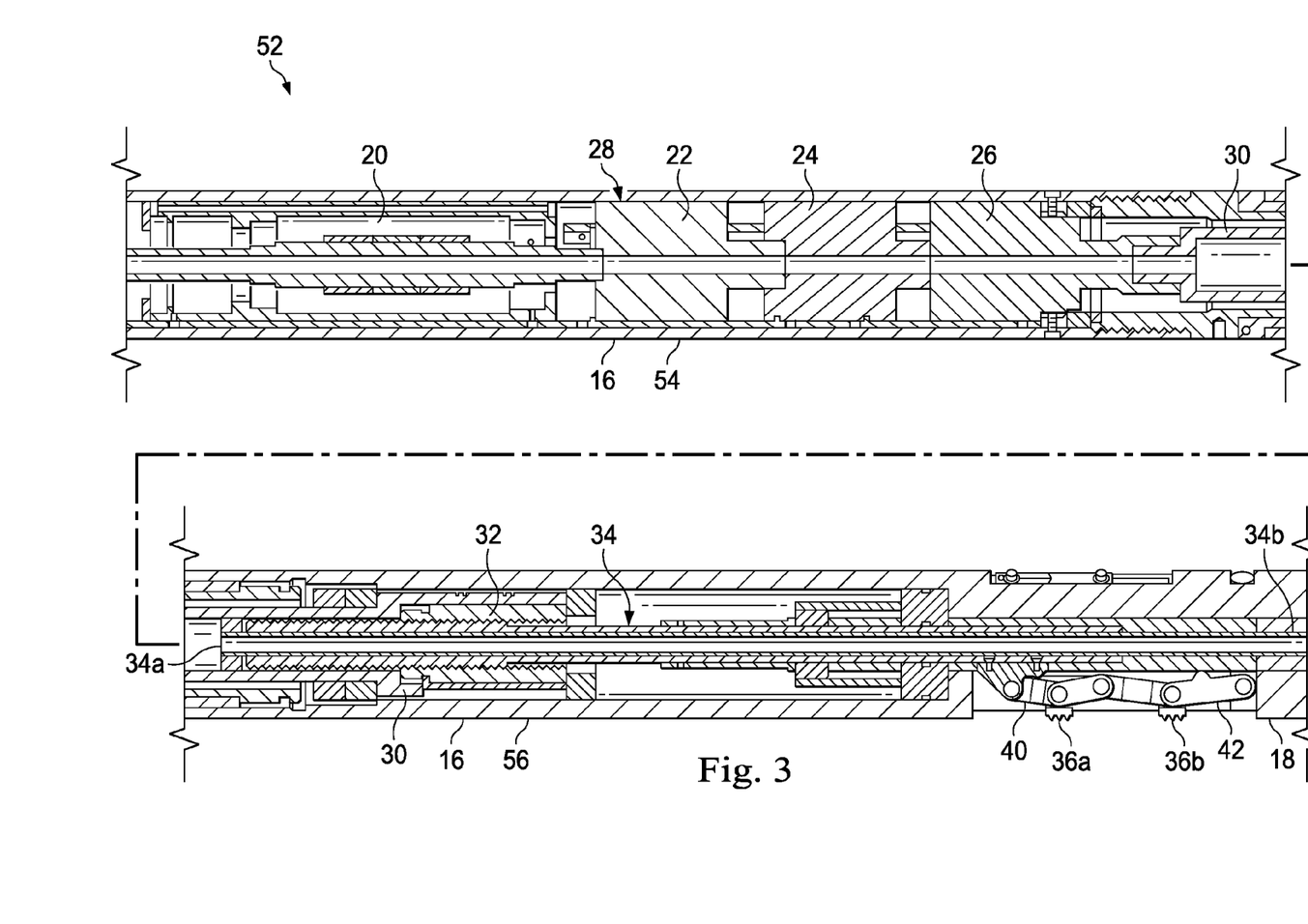
FIG. 3 is a sectional view of a section of a downhole apparatus according to another exemplary embodiment.

In an exemplary embodiment, as illustrated in FIG. 3 with continuing reference to FIGS. 1 and 2, a downhole apparatus is generally referred to by the reference numeral 52 and includes all of the components of the downhole apparatus 10 of FIGS. 1 and 2, which components are given the same reference numerals. In the downhole apparatus 52 shown in FIG. 3, the housing 16 includes connected tubular members 54 and 56, with at least the motor 20, the input gearbox 22, the clutch 24, and the output gearbox 26 extending within the tubular member 54, and at least the adapter 30, the nut 32, and the linear actuator 34 extending within the tubular member 56. In the downhole apparatus 52, the linear actuator 34 is a ballscrew, the nut 32 is a ball nut, and the adapter 30 is a ball nut adapter, as shown in FIG. 3. The anchor element 36 includes a plurality of anchor elements, which are given reference numerals 36a and 36b. In several exemplary embodiments, the operation of the downhole apparatus 52 is identical to the above-described operation of the downhole apparatus 10. Therefore, the operation of the downhole apparatus 52 will not be described in detail.

Figure 4:
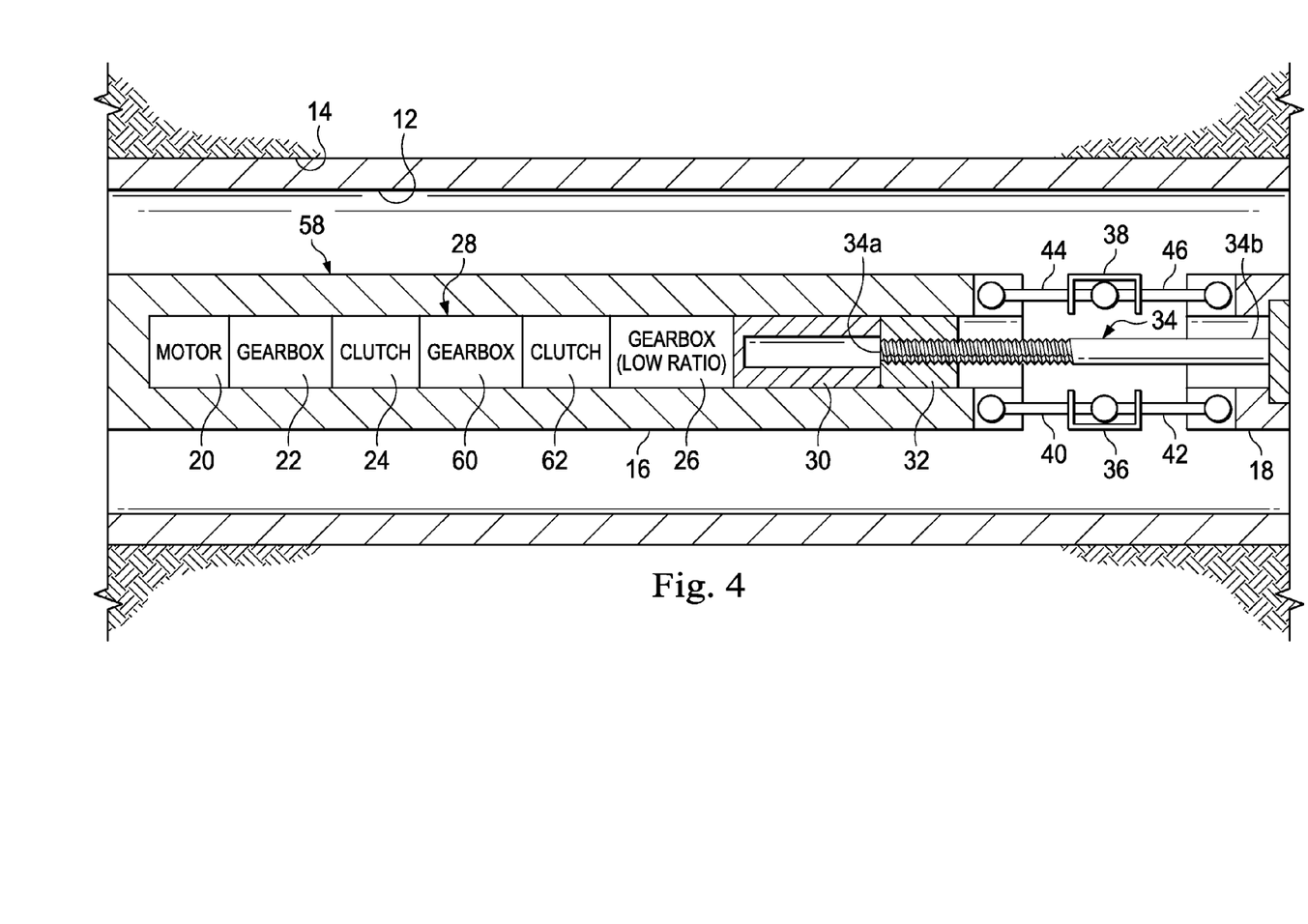
FIG. 4 is a diagrammatic illustration of a section of a downhole apparatus disposed according to yet another exemplary embodiment.

In an exemplary embodiment, as illustrated in FIG. 4 with continuing reference to FIGS. 1-3, a downhole apparatus is generally referred to by the reference numeral 58 and includes all of the components of the downhole apparatus 10 of FIGS. 1 and 2, which components are given the same reference numerals. In the downhole apparatus 58 shown in FIG. 4, an intermediate gearbox 60 is mechanically coupled to the clutch 24. A clutch 62 is mechanically coupled between the intermediate gearbox 60 and the output gearbox 26. The intermediate gearbox 60 has a gear ratio that is greater than the gear ratio of the output gearbox 26. Thus, the gear ratio of the output gearbox 26 is less than each of the respective gear ratios of the input gearbox 22 and the intermediate gearbox 26. In an exemplary embodiment, the gear ratio of the intermediate gearbox 60 is equal to the gear ratio of the input gearbox 22. In an exemplary embodiment, the gear ratio of the intermediate gearbox 60 is different from the gear ratio of the input gearbox 22. In an exemplary embodiment, the gear ratio of the intermediate gearbox 60 is greater than the gear ratio of the input gearbox 22. In an exemplary embodiment, the gear ratio of the intermediate gearbox 60 is less than the gear ratio of the input gearbox 22.

In an exemplary embodiment, the operation of the downhole apparatus 58 is identical to the above-described operation of the downhole apparatus 10, with some exceptions. In particular, to deploy or collapse the anchor elements 36 and 38 using the motor 20, the motor 20 is energized with electrical power and the motor 20 is operated to drive the input gearbox 22, which in turn drives the intermediate gearbox 60 via the clutch 24, and the intermediate gearbox 60 drives the output gearbox 26 via the clutch 62. This is in contrast to the input gearbox 22 driving the output gearbox 26 via the clutch 24 in the downhole apparatus 10 of FIGS. 1 and 2. Further, in the downhole apparatus 58 of FIG. 4, the clutch 62 automatically decouples at least the intermediate gearbox 60 from the output gearbox 26 when the motor 20 is de-energized. This is in contrast to the clutch 24 automatically decoupling the input gearbox 22 from the output gearbox 26 when the motor 20 is de-energized in the downhole apparatus 10 of FIGS. 1 and 2. Still further, in the downhole apparatus 58 of FIG. 4, at least the motor 20, the input gearbox 22, and the intermediate gearbox 60 are disengaged from the high torque electromechanical transmission drive 28. This is in contrast to at least the motor 20 and the input gearbox 22 (but not another gearbox) being disengaged from the high torque electromechanical transmission drive 28 in the downhole apparatus 10 of FIG. 1. The remainder of the operation of the downhole apparatus 58 of FIG. 4 is identical to the remainder of the operation of the downhole apparatus 10 of FIGS. 1 and 2. Therefore, the operation of the downhole apparatus 58 of FIG. 4 will not be described in further detail.

In several exemplary embodiments, the downhole apparatus 58 may be used instead of the downhole apparatus 10 or 52 due to higher torque requirements for the same tool diameter. In an exemplary embodiment, the downhole apparatus 58 is an exemplary embodiment of the scalability of the aspects of the downhole apparatus 10 or 52. As torque requirements increase, these requirements may be met by having a higher gear reduction by including one or more intermediate gearboxes, in addition to the intermediate gearbox 60, and including a clutch between each pair of adjacent gearboxes; as a result, the respective diameters of the gearboxes and the clutches may be minimized so that the components will be sized for downhole applications.

The present disclosure introduces a downhole apparatus having a longitudinal center axis and including first and second housings spaced along the longitudinal center axis; an anchor element mechanically coupled between the first and second housings and linked to move radially between first and second radial positions in response to relative axial movement between the first and second housings; a motor extending within the first housing and driving an input gearbox having a first gear ratio; a first clutch mechanically coupled to the input gearbox; and an output gearbox optionally coupled to the first clutch so that the output gearbox is driven by the input gearbox when the first clutch is engaged; wherein the output gearbox has a second gear ratio that is less than the first gear ratio; and wherein, when the first clutch is engaged, the output gearbox drives axial movement of the second housing, relative to the first housing and in a first direction, so that the anchor element moves from the first radial position to the second radial position. In an exemplary embodiment, the first and second housings are adapted to extend within a preexisting structure; wherein the anchor element is not adapted to engage the preexisting structure when the anchor element is in the first radial position and the first and second housings extend within the preexisting structure; and wherein the anchor element is adapted to engage the preexisting structure to prevent, or at least resist, relative axial movement between the preexisting structure and each of the first and second housings when the anchor element is in the second radial position and the first and second housings extend within the preexisting structure. In an exemplary embodiment, the preexisting structure is a casing positioned within a wellbore that traverses one or more subterranean formations. In an exemplary embodiment, the first clutch decouples the input gearbox from the output gearbox when the motor is de-energized; and wherein, when the input gearbox is decoupled from the output gearbox, the second gear ratio of the output gearbox permits: the anchor element to move radially from the second radial position and at least towards the first radial position, the second housing to move axially, relative to the first housing and in a second direction that is opposite the first direction, in response to the radial movement of the anchor element from the second radial position and at least towards the first radial position, and the output gearbox to be back driven in response to the axial movement of the second housing, relative to the first housing and in the second direction. In an exemplary embodiment, the downhole apparatus includes a linear actuator extending within the first housing, connected to the second housing, and adapted to move in the first and second directions; wherein via at least the linear actuator the output gearbox is adapted to drive the axial movement of the second housing, relative to the first housing and in the first direction. In an exemplary embodiment, the linear actuator is one of a ballscrew and a leadscrew; wherein the downhole apparatus further includes a nut engaged with the linear actuator; and wherein the output gearbox is adapted to drive the nut to move the linear actuator in the first direction and thereby drive the axial movement of the second housing, relative to the first housing and in the first direction. In an exemplary embodiment, the downhole apparatus includes an adapter connected to the nut and mechanically coupled to the output gearbox; wherein the output gearbox is adapted to drive the adapter and thus the nut to move the linear actuator in the first direction and thereby drive the axial movement of the second housing, relative to the first housing and in the first direction. In an exemplary embodiment, the first gear ratio of the input gearbox is 200:1, the second gear ratio of the output gearbox is 5:1, and the motor is a DC motor and DC power is adapted to be supplied to the motor. In an exemplary embodiment, the downhole apparatus includes an intermediate gearbox mechanically coupled to the first clutch, the intermediate gearbox having a third gear ratio; and a second clutch mechanically coupled between the intermediate gearbox and the output gearbox; wherein the second gear ratio of the output gearbox is less than the third gear ratio of the intermediate gearbox; and wherein the third gear ratio of the intermediate gearbox is equal to, or different from, the first gear ratio of the input gearbox. In an exemplary embodiment, the second clutch is adapted to mechanically decouple at least the intermediate gearbox from the output gearbox when the power is not supplied to the motor.

The present disclosure also introduces a method that includes disposing a downhole apparatus within a preexisting structure, the downhole apparatus having a longitudinal center axis and including: first and second housings spaced along the longitudinal center axis; an anchor element mechanically coupled between the first and second housings; a motor extending within the first housing and driving an input gearbox; and an output gearbox optionally coupled to the input gearbox; anchoring the downhole apparatus to the preexisting structure, including energizing the motor; and radially moving the anchor element, using at least the motor, the input gearbox, and the output gearbox, so that the anchor element engages the preexisting structure; and automatically releasing the downhole apparatus from the preexisting structure in response to de-energization of the motor; wherein automatically releasing the downhole apparatus from the preexisting structure includes automatically decoupling the input gearbox from the output gear box; and permitting the output gear box to be back driven. In an exemplary embodiment, automatically decoupling the input gearbox from the output gear box includes automatically decoupling the input gearbox from the output gear box using a clutch that is mechanically coupled between the input gearbox and the output gearbox. In an exemplary embodiment, radially moving the anchor element so that the anchor element engages the preexisting structure includes using the output gearbox to drive axial movement of the second housing, relative to the first housing and in a first direction; and wherein automatically releasing the downhole apparatus from the preexisting structure further includes permitting the anchor element to move radially inwards; and permitting the second housing to move axially, relative to the first housing and in a second direction that is opposite to the first direction. In an exemplary embodiment, the output gearbox is back driven in response to the axial movement of the second housing, relative to the first housing and in the second direction. In an exemplary embodiment, the preexisting structure is a casing positioned within a wellbore that traverses one or more subterranean formations. In an exemplary embodiment, the input gearbox has a first gear ratio, and the output gearbox has a second gear ratio that is less than the first gear ratio. In an exemplary embodiment, the first gear ratio of the input gearbox is 200:1, the second gear ratio of the output gearbox is 5:1, and the motor is a DC motor and DC power is adapted to be supplied to the motor.

The present disclosure also introduces a downhole apparatus having a longitudinal center axis and including first and second housings spaced along the longitudinal center axis; an anchor element mechanically coupled between the first and second housings and linked to move radially between first and second radial positions in response to relative axial movement between the first and second housings; and a high torque electromechanical transmission drive to which electrical power is supplied; wherein the anchor element is adapted to engage a preexisting structure when the downhole apparatus extends within the preexisting structure, the electrical power is supplied to the high torque electromechanical transmission drive, and the anchor element is in the second radial position; and wherein the high torque electromechanical transmission drive is failsafe in that the anchor element is permitted to move radially from the second radial position and towards the first radial position in response to a cessation of the supply of the electrical power to the high torque electromechanical transmission drive. In an exemplary embodiment, the high torque electromechanical transmission drive includes a motor extending within the first housing and driving an input gearbox having a first gear ratio; a clutch mechanically coupled to the input gearbox; and an output gearbox optionally coupled to the clutch so that the output gearbox is driven by the input gearbox when the clutch is engaged; wherein the output gearbox has a second gear ratio that is less than the first gear ratio; and wherein, when the clutch is engaged, the output gearbox drives axial movement of the second housing, relative to the first housing and in a first direction, so that the anchor element moves from the first radial position to the second radial position. In an exemplary embodiment, the clutch decouples the input gearbox from the output gearbox when the motor is de-energized; and wherein, when the input gearbox is decoupled from the output gearbox, the second gear ratio of the output gearbox permits: the anchor element to move radially from the second radial position and at least towards the first radial position; the second housing to move axially, relative to the first housing and in a second direction that is opposite the first direction, in response to the radial movement of the anchor element from the second radial position and at least towards the first radial position; and the output gearbox to be back driven in response to the axial movement of the second housing, relative to the first housing and in the second direction.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, or combined, at least in part, with one or more of the other elements and teachings of the various illustrative embodiments.

In several exemplary embodiments, while different steps, processes, and procedures are described as appearing as distinct acts, one or more of the steps, one or more of the processes, or one or more of the procedures may also be performed in different orders, simultaneously, or sequentially. In several exemplary embodiments, the steps, processes, or procedures may be merged into one or more steps, processes, or procedures. In several exemplary embodiments, one or more of the operational steps in each embodiment may be omitted. Moreover, in some instances, some features of the present disclosure may be employed without a corresponding use of the other features. Moreover, one or more of the above-described embodiments or variations may be combined in whole or in part with any one or more of the other above-described embodiments or variations.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

What is claimed is:

1. A downhole apparatus having a longitudinal center axis and comprising:
    first and second housings spaced along the longitudinal center axis;
    an anchor element mechanically coupled between the first and second housings and linked to move radially between first and second radial positions in response to relative axial movement between the first and second housings;
    a motor extending within the first housing and driving an input gearbox having a first gear ratio;
    a first clutch mechanically coupled to the input gearbox;
    an output gearbox optionally coupled to the first clutch so that the output gearbox is driven by the input gearbox when the first clutch is engaged;
    an intermediate gearbox mechanically coupled to the first clutch, the intermediate gearbox having a third gear ratio; and
    a second clutch mechanically coupled between the intermediate gearbox and the output gearbox;
    wherein the output gearbox has a second gear ratio that is less than the first gear ratio;
    wherein, when the first clutch is engaged, the output gearbox drives axial movement of the second housing, relative to the first housing and in a first direction, so that the anchor element moves from the first radial position to the second radial position;
    wherein the second gear ratio of the output gearbox is less than the third gear ratio of the intermediate gearbox; and
    wherein the third gear ratio of the intermediate gearbox is equal to, or different from, the first gear ratio of the input gearbox.

2. The downhole apparatus of claim 1,
    wherein the first and second housings are adapted to extend within a preexisting structure;
    wherein the anchor element is not adapted to engage the preexisting structure when the anchor element is in the first radial position and the first and second housings extend within the preexisting structure; and
    wherein the anchor element is adapted to engage the preexisting structure to prevent, or at least resist, relative axial movement between the preexisting structure and each of the first and second housings when the anchor element is in the second radial position and the first and second housings extend within the preexisting structure.

3. The downhole apparatus of claim 2, wherein the preexisting structure is a casing positioned within a wellbore that traverses one or more subterranean formations.

4. The downhole apparatus of claim 1,
    wherein the first clutch decouples the input gearbox from the output gearbox when the motor is de-energized; and
    wherein, when the input gearbox is decoupled from the output gearbox, the second gear ratio of the output gearbox permits:
        the anchor element to move radially from the second radial position and at least towards the first radial position,
        the second housing to move axially, relative to the first housing and in a second direction that is opposite the first direction, in response to the radial movement of the anchor element from the second radial position and at least towards the first radial position, and
        the output gearbox to be back driven in response to the axial movement of the second housing, relative to the first housing and in the second direction.

5. The downhole apparatus of claim 1, further comprising:
    a linear actuator extending within the first housing, connected to the second housing, and adapted to move in the first and second directions;
    wherein via at least the linear actuator the output gearbox is adapted to drive the axial movement of the second housing, relative to the first housing and in the first direction.

6. The downhole apparatus of claim 5,
    wherein the linear actuator is one of a ballscrew and a leadscrew;
    wherein the downhole apparatus further comprises a nut engaged with the linear actuator; and wherein the output gearbox is adapted to drive the nut to move the linear actuator in the first direction and thereby drive the axial movement of the second housing, relative to the first housing and in the first direction.

7. The downhole apparatus of claim 6, further comprising:
an adapter connected to the nut and mechanically coupled to the output gearbox;
wherein the output gearbox is adapted to drive the adapter and thus the nut to move the linear actuator in the first direction and thereby drive the axial movement of the second housing, relative to the first housing and in the first direction.

8. The downhole apparatus of claim 1,
wherein the first gear ratio of the input gearbox is 200:1;
wherein the second gear ratio of the output gearbox is 5:1; and
wherein the motor is a DC motor and DC power is adapted to be supplied to the motor.

9. The downhole apparatus of claim 1, wherein the second clutch is adapted to decouple at least the intermediate gearbox from the output gearbox when the power is not supplied to the motor.

10. A method, comprising:
disposing a downhole apparatus within a preexisting structure, the downhole apparatus having a longitudinal center axis and comprising: first and second housings spaced along the longitudinal center axis; an anchor element mechanically coupled between the first and second housings; a motor extending within the first housing and driving an input gearbox; a first clutch mechanically coupled to the input gearbox; an output gearbox optionally coupled to the input gearbox via the first clutch; an intermediate gearbox mechanically coupled to the first clutch; and a second clutch mechanically coupled between the intermediate gearbox and the output gearbox;
anchoring the downhole apparatus to the preexisting structure, comprising:
energizing the motor; and
radially moving the anchor element, using at least the motor, the input gearbox, and the output gearbox, so that the anchor element engages the preexisting structure;
and
automatically releasing the downhole apparatus from the preexisting structure in response to de-energization of the motor;
wherein automatically releasing the downhole apparatus from the preexisting structure comprises:
automatically decoupling the input gearbox from the output gear box; and
permitting the output gear box to be back driven.

11. The method of claim 10, wherein automatically decoupling the input gearbox from the output gear box comprises automatically decoupling the input gearbox from the output gear box using the first and/or second clutch that is mechanically coupled between the input gearbox and the output gearbox.

12. The method of claim 10,
wherein radially moving the anchor element so that the anchor element engages the preexisting structure comprises using the output gearbox to drive axial movement of the second housing, relative to the first housing and in a first direction;
and wherein automatically releasing the downhole apparatus from the preexisting structure further comprises:
permitting the anchor element to move radially inwards; and
permitting the second housing to move axially, relative to the first housing and in a second direction that is opposite to the first direction.

13. The method of claim 12, wherein the output gearbox is back driven in response to the axial movement of the second housing, relative to the first housing and in the second direction.

14. The method of claim 10, wherein the preexisting structure is a casing positioned within a wellbore that traverses one or more subterranean formations.

15. The method of claim 10,
wherein the input gearbox has a first gear ratio; and
wherein the output gearbox has a second gear ratio that is less than the first gear ratio.

16. The method of claim 15,
wherein the first gear ratio of the input gearbox is 200:1;
wherein the second gear ratio of the output gearbox is 5:1; and
wherein the motor is a DC motor and DC power is adapted to be supplied to the motor.

17. A downhole apparatus having a longitudinal center axis and comprising:
first and second housings spaced along the longitudinal center axis;
an anchor element mechanically coupled between the first and second housings and linked to move radially between first and second radial positions in response to relative axial movement between the first and second housings; and
a high torque electromechanical transmission drive, comprising:
a motor extending within the first housing and driving an input gearbox;
a first clutch mechanically coupled to the input gearbox;
an output gearbox optionally coupled to the first clutch so that the output gearbox is driven by the input gearbox when the first clutch is engaged;
an intermediate gearbox mechanically coupled to the first clutch; and
a second clutch mechanically coupled between the intermediate gearbox and the output gearbox;
wherein the anchor element is adapted to engage a preexisting structure when the downhole apparatus extends within the preexisting structure, the high torque electromechanical transmission drive is energized, and the anchor element is in the second radial position; and
wherein the high torque electromechanical transmission drive is failsafe in that the anchor element is permitted to move radially from the second radial position and towards the first radial position in response to de-energization of the high torque electromechanical transmission drive.

18. The downhole apparatus of claim 17, wherein the
input gearbox has a first gear ratio;
wherein the output gearbox has a second gear ratio that is less than the first gear ratio of the input gearbox;
wherein the intermediate gearbox has a third gear ratio that is greater than the second gear ratio of the output gearbox and equal to, or different from, the first gear ratio of the input gearbox; and
wherein, when the first and second clutches are engaged, the output gearbox drives axial movement of the second housing, relative to the first housing and in a first direction, so that the anchor element moves from the first radial position to the second radial position.

19. The downhole apparatus of claim 18,
wherein the first and/or second clutch decouples the input gearbox from the output gearbox when the motor is de-energized;
and
wherein, when the input gearbox is decoupled from the output gearbox, the second gear ratio of the output gearbox permits:
  the anchor element to move radially from the second radial position and at least towards the first radial position;
  the second housing to move axially, relative to the first housing and in a second direction that is opposite the first direction, in response to the radial movement of the anchor element from the second radial position and at least towards the first radial position; and
  the output gearbox to be back driven in response to the axial movement of the second housing, relative to the first housing and in the second direction.

\* \* \* \* \*